(12) United States Patent
Manne

(10) Patent No.: US 7,783,034 B2
(45) Date of Patent: Aug. 24, 2010

(54) COMMUNICATION PRIVACY MASK

(75) Inventor: Joseph Manne, New York, NY (US)

(73) Assignee: JB Scientific, LLC, New York, NY (US)

(*) Notice: Subject to any disclaimer, the term of this patent is extended or adjusted under 35 U.S.C. 154(b) by 140 days.

(21) Appl. No.: 12/199,543

(22) Filed: Aug. 27, 2008

(65) Prior Publication Data

US 2009/0060169 A1 Mar. 5, 2009

Related U.S. Application Data

(60) Provisional application No. 60/968,137, filed on Aug. 27, 2007.

(51) Int. Cl.
*H04M 1/00* (2006.01)
*H04M 9/00* (2006.01)

(52) U.S. Cl. .................. 379/441; 379/444; 379/447; 455/575.6

(58) Field of Classification Search ......... 379/441–444, 379/447; 381/87, 333, 353, 354, 359; 181/21; 455/575.1, 575.6, 90.3
See application file for complete search history.

(56) References Cited

U.S. PATENT DOCUMENTS

| | | | |
|---|---|---|---|
| 2,558,278 A | 6/1951 | Stone et al. | |
| 2,745,911 A | 5/1956 | Webb | |
| 2,855,067 A | 10/1958 | Di Mattia | |
| 2,857,013 A | 10/1958 | Orso | |
| 3,114,802 A | 12/1963 | Beguin | |
| 3,796,842 A | 3/1974 | Guille | |
| 4,129,754 A | 12/1978 | Gore | |
| 4,396,089 A | 8/1983 | Scully | |
| 4,537,276 A * | 8/1985 | Confer | 181/21 |
| 4,834,212 A | 5/1989 | Figone et al. | |
| 4,932,495 A | 6/1990 | Chapman | |
| 6,285,772 B1 | 9/2001 | Tate et al. | |
| 7,221,966 B2 | 5/2007 | Birli et al. | |

FOREIGN PATENT DOCUMENTS

| | | |
|---|---|---|
| JP | 2000174875 Y | 6/2000 |
| JP | 2006287886 A | 10/2006 |
| JP | 2006340187 Y | 12/2006 |
| KR | 200252560 Y | 11/2001 |
| KR | 200398317 Y | 10/2005 |

OTHER PUBLICATIONS

A. Selamet, M. B. Xu, I.-J. Lee and N. T. Huff, Analytical approach for sound attenuation in perforated dissipative silencers, J. Acoust. Soc. Am., May 2004, vol. 115, No. 5, Pt.1, pp. 2091-2099, Acoustical Society of America.
Peter D'Antonio,RPG Diffusor Systems, Inc., Upper Marlboro, MD, Minimizing Acoustic Distortion in Home Theaters.
Dr. Peter D'Antonio, RPG Diffusor Systems, Inc., Minimizing Acoustic Distortion in Project Studios, Listen to the Music, Not the Room! pp. 1-21.

* cited by examiner

*Primary Examiner*—Tuan D Nguyen
(74) *Attorney, Agent, or Firm*—Lucas & Mercanti, LLP

(57) ABSTRACT

The communication privacy mask has a housing having an opening coupled with a mouth piece and a hollow sound tube mounted in the housing. A microphone is positioned in the sound tube with a space in front of the front end of the microphone.

12 Claims, 5 Drawing Sheets

COMMUNICATION PRIVACY MASK

TECHNICAL FIELD OF THE INVENTION

This invention is directed to a privacy mask device with a microphone for any electronic communication device in which a voice is used to activate the microphone. In particular, it can be used with mobile or cellular telephone (cell phone), into which a user can speak without being heard by others. It can also be used in conjunction with a stationary telephone with a microphone jack, or with dictation machines where privacy is needed.

BACKGROUND AND OBJECTS OF THE INVENTION

Electronic communication devices, such as cell phones are frequently used in public places. There is an increasing concern that the privacy of speech by using cell phone in such an open environment is not secured.

Masks equipped with a microphone are known. For example, U.S. Pat. No. 4,129,754 disclosed a hand-held reporting device for use in environments wherein a minimum of sound in connection with use of the device is a priority and in environments having a high level of noise intensity. The device includes a barrel with a bell-shaped top, the top is preferably set at an angle with respect to the barrel. A microphone is positioned at the end of the barrel remote from the bell-shaped top. The reporting device includes means for permitting pressurized air within the device to escape via an air communication channel from inside the device through a portion of the face piece of the device to the outside.

A more elaborated device has been disclosed in U.S. Pat. No. 3,796,842. It relates to a dictation mask adaptable for use by a court reporter, which is electrically connected to a recording apparatus for recording the voice of the dictator. The '842 patent teaches a generally spherically-shaped member providing an area for fitting on the face of the dictator and including a plurality of chambers serially in communication by means of apertures. Some of the chambers having muffling coils mounted therein for receiving the breath and voice of the dictator and muffling the sound there from. The muffling coil are provided with a plurality of spaced-apart breath exhaust passages, wherein, the spherically-shaped member is provided with a handle and the handle is provided with one of said plurality of chambers.

A problem in the prior art mask devices has been the signal distortion generated by the design of these devices. In particular, these devices have positioned the transducer or microphone in a way that is not optimized for sound fidelity. A further problem with prior art devices has been the air pressure build-up within the device when the user speaks with the device pressed against his or her mouth. The pressure tends to generate sound distortion and a low signal to noise ratio on the transducer. A second problem with existing designs is that noise created outside the device can be conducted in and create unwanted background noise during a conversation. Finally, existing designs allow significant leakage of sound to the environment outside the device.

There is therefore a need for a privacy mask having good sound fidelity, less pressure buildup, which also blocks outside sound from coming in and blocks inside voice from leaking out.

SUMMARY OF THE INVENTION

A communication privacy mask has been discovered which is capable of providing a sound signal having high fidelity when used in environments with a substantial level of noise outside the mask. The invention provides a device having high signal to noise ratio while preventing the voice from being heard by others. The device also cut out background noise which would interfere with the intelligibility of speech of the caller. In addition, using the device avoids disturbing others while making a phone call in public. The device of the invention is easy to carry and use. It is also easy to clean and maintain.

In particular, this invention relates to a cellular telephone privacy mask equipped with a transducer, such as a microphone, which a user can speak into with privacy. The mask includes a cup-shaped housing having an opening and a wall, a sound tube having an open end and mounted inside the housing; a microphone mounted in the tube with a space between the one end of the tube and a front end of the microphone.

Preferably, a valve is mounted in a wall of the housing. More preferably, the valve is positioned at the back of the cup, opposite the opening of the cop.

Preferably, the communication privacy mask of this invention further includes a hollow mouthpiece having two open ends with one end being adapted for mounting on the opening of the housing and other end being adapted for the contour of the facial area around the mouth of the user of said device.

In a preferred embodiment, the sound tube is mounted inside the housing via an adjustable bracket. The bracket is preferred to be adjustable from a tangential position to a linear position corresponding to a user's mouth, so that the direction of the head of the microphone can be in any position from perpendicular to the direction of the mouth to facing the mouth. Further the sound tube can be movable on the bracket linearly to be closer to or farther from the user's mouth.

The microphone is preferably an Electret Condenser Noise Canceling microphone. It may also be a condenser microphone.

The sound tube is of a size with an inside diameter matching the outside diameter of the microphone mounted inside the tube. The microphone is fixed in the sound tube by bracket or function force in the tube with a space in front of the head of the tube.

In some embodiments, the device may further include small perforations in the wall of the housing to release air pressure and muffle sound.

The size of the housing is of conventional face masks and allows the user's fingers to at least partially wrap around. The mouth piece is of a size and contour such that it can be placed over the mouth with substantially the entire brim contacting the user's skin.

In certain embodiments, the housing may further include a detachable liner of sound and moisture absorbing material mounted on the inner surface of the wall of the housing and the liner may be formed of a soft perforated vinyl plastic or foam urethane.

The communication privacy mask may further include an ear piece connected to the microphone and further connected to a cell phone by conventional wiring. The mask can also be connected to the cell phone by Bluetooth technology.

A head strap may also be provided to secure the mask to the user's face, to allow for hands free use of the device.

The communication privacy mask of the present invention provides efficient muffling properties and good voice fidelity by special arrangements of the microphone in the mask. This simple structured device is relatively lightweight. It further facilitates easy handling for the user to wear and maintain the device.

These and other aspects of the present invention may be more fully understood by referring to one or more the following drawings which are used for illustration purpose only.

DETAILED DESCRIPTION OF THE INVENTION

The advantages and details of the communication privacy mask will be apparent from the following detailed description of preferred embodiments of the invention.

Figure 1:
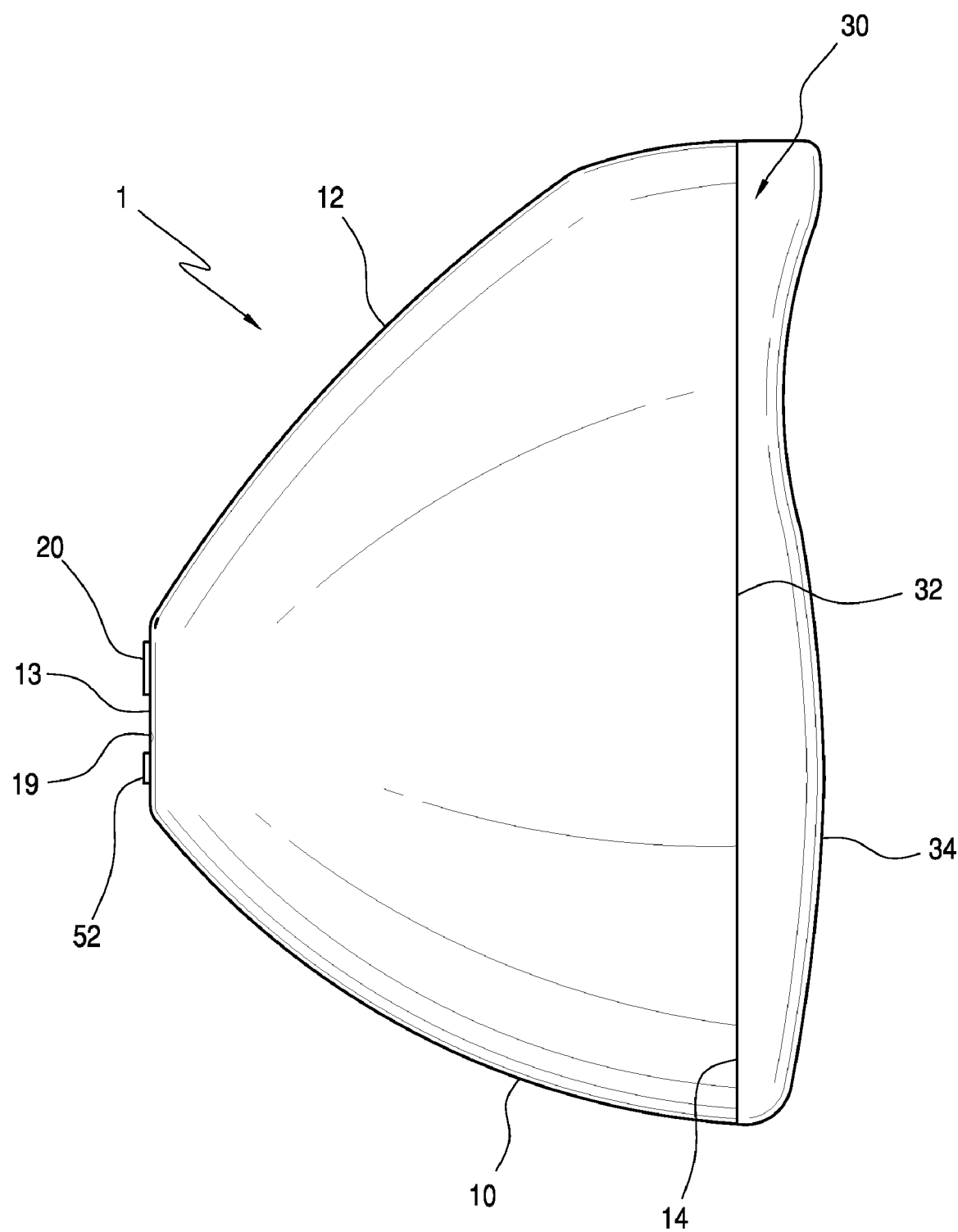
FIG. 1 is a side view of the device of the invention.

Referring to FIG. 1, mask 1 has cup-shaped housing portion 10 with wall 12, closed end 13 and opening 14. Mouth piece 30 has housing side 32 affixed to the opening 14 and brim 34 for molding to a user's mouth contour. Shown in FIG. 1, the cross section of housing 10 looks like letter C. In preferred embodiments, a foldable or flexible mask is provided so that the customer could carry it in their pocket, briefcase or pocket-book. The flexible housing is suitably made of silicone, synthetic rubbers or other flexible material. It can also be a simple hollow structure with no baffling or muffling coils.

Housing 10 is necessarily hollow, and of a size such that the fingers can be at least partially wrapped around the body portion for holding of the cup. Preferably, housing 10 is about 10 cm in diameter and about 7.5 cm in depth from the closed end to the opening, with an internal volume in the range of 100 cm$^3$ to 260 cm$^3$. The depth of housing 10 must have a sufficient space to permit necessary movement of the user's lips. Mouthpiece 30 is of a size and contour such that it can be placed over the mouth with substantially the entire brim 34 contacting the user's skin. The housing portion 10 can also be of the size and contour that cover the user's mouth and nose. In some embodiments, the mask can cover the user's mouth and chin and the neck right below the chin. In this way, lip movements are less impeded and the pronunciation of words is clearer.

Figure 2:
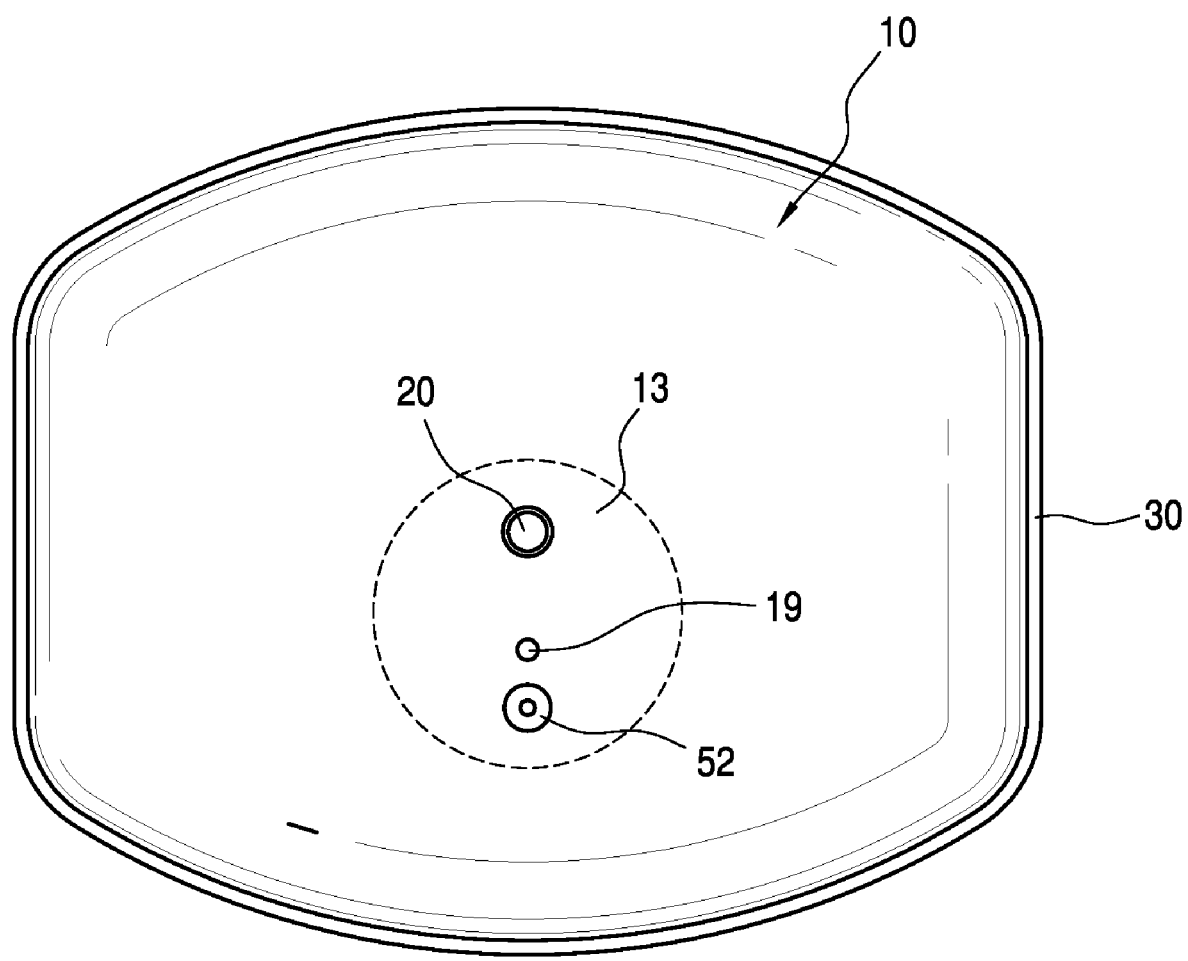
FIG. 2 is a front view of the device of the invention.

Housing 10 may contain linings for better sound absorption. Housing 10 and other structural elements of mask 1 can be formed by any of suitable materials including plastic or rubber, preferably of a non-resonant material such as cellulose acetate butyrate, Nylon, polycarbonate, polyolefin silicone, synthetic rubbers or the like. Housing 10 is shown as essentially circular in cross-section in frontal view as shown if FIG. 2, however, any convenient and readily manufacturable shape may be employed, including square or oval shape.

Mouthpiece 30 is of a preferable size and contour such that it can be placed over the mouth with substantially the entire brim 34 contacting the skin along a generally elliptical or circular lined area between the mouth side of the nose and chin. However, the privacy mask of the present invention may also extend over the nose of a user. Mouthpiece 30 can be an integral extension of the wall of housing 10 or it can be affixed thereto by mechanical means. Mouthpiece 30 is preferably removable. In some embodiments, mouthpiece 30 can be made of fluid filed cuff filled with air or water. Air or fluid filled cuff makes much better seal around mouth, since it is most deformable and makes best seal. However, mouthpiece 30 can also be plastic foam of rubber material with the rigidity variations being caused by the thickness and deformability of the material. Preferably, mouthpiece 30 may have thin and thus very deformable material in the area contacting the user's face in order that there will be a relatively airtight connection between mouthpiece 30 and the face to prevent substantial vocal sound from escaping the device.

Housing 10 can be of elastic material, such as silicone. While housing 10 can have a lining formed of sound absorbing material, it can be perforated for better noise muffling. In some embodiments, a simple cast polymer material, with small perforations is effective for the purposes of the invention.

It is known that, when the user presses the mask against his/her mouth area, the interior chamber of the device becomes relatively air tight for all practical purposes. Any attempt to speak into such air tight chamber results in elevated pressure within the device and results an inaudible or unintelligible sound picked up by the microphone inside. It was discovered that the transmission of sound from the inside to the outside of a privacy system can be substantially diminished through the use of back pressure.

Back pressure refers to the pressure created inside the privacy mask which actually diminishes the volume of gas exhaled by the privacy mask user. It is known that speaking creates sound that emanates from the speaker's body in different ways. Some of the sound waves travel out through the mouth into the privacy mask. Some of the sound waves travel out through the nose. If the volume and flow rate of air exhaled by the user is large enough, then a significant portion of the sound wave created at the vocal cord escapes into the open air via the nose. However through experimentation it was found that if the flow rate and total volume of air exhaled was reduced then the sound emanating through the nose and through the facial bones and soft tissue was inaudible. At the same time although the flow rate and volume is reduced, the volume of sound traveling through the mouth is sufficient to produce a clear audible sound on the enclosed microphone.

It was found that there is a specific pressure range within the privacy mask which produces an audible microphone sound while preventing audible sound outside the mask. The desired pressure range in the mask is between 4 mmHg and 8 mmHg. If the pressure falls below 4 mmHg the volume and flow rate of exhaled air is high enough to allow for significant vocal sound transmission though the nose and though the soft and bony tissue in the face, audible sound will be emanated through the nose and the soft tissue or bones in the speaker's head. If the pressure goes above 8 mm Hg there is enough obstruction to exhalation and the pressure will prevent an audible voice to be heard on the microphone enclosed in the privacy mask.

To provide a suitable internal pressure in the mask, the present invention provides one or more adjustable valve 20. The opening of the valve can be tightened or loosened to adjust the pressure inside the mask to a range between 4 and 8 mmHg. The opening of valve 20 releases air to the exterior, which prevents excessive pressure build-up within the mask and reduces distortion accompanying pressure build-up in such the mask. The closing of valve 20 maintains suitable back pressure to minimize the escaping of sound from the speaker. The valve can be adjusted with an inexpensive pressure gauge for the individual user. Another way of adjusting the valve opening is through empirical trials. The user adjusts the valve opening until there is no audible sound for those standing near the user of the privacy mask. The valve opening is further adjusted so that the sound of the user's voice is clearly heard on the microphone inside the privacy mask.

Any kind or shape of adjustable valve can be used as long as it can regulate the air pressure associated with speaking. The valve opening should be small enough so that the vocal sounds inside the mask cannot be heard outside the mask. Suitable valves include needle valves, superposition of two discs with holes, or holes with adjustable cover, or screw down caps. The valve can be an adjustable one-way valve to be automatically open when an air pressure inside the mask goes above certain level. A spring loaded valve may respond to the internal pressure of the mask so that the size of its opening is automatically adjusted proportionally to the pressure inside the mask. It can also be an opening with screw thread to control the pressure by adjusting air flow rate. The valve can be cemented to its position or fixed thereto by means of screws or in any other desirable manner.

Present invention can also include one or multiple perforations 19 in wall 12. The perforations can be placed at the closed end opposite the speaker's mouth. It also can be placed elsewhere in wall 12. The perforations can have a diameter in the range of 0.15-0.25 cm. The presence of a few small simple perforations can muffle the noise in the mask. The noise muffling effect is primarily by virtue of a limited pressure drop through small perforation in the wall of the mask.

Experiments showed suitable perforations can tune the air pressure into a suitable range, which prevents the distortion of the voice and provides efficient sound muffling properties. The mask with this arrangement entraps, compresses or deadens the sound waves and reduces or eliminates the sound tending to emanate from the mask.

Figure 3:
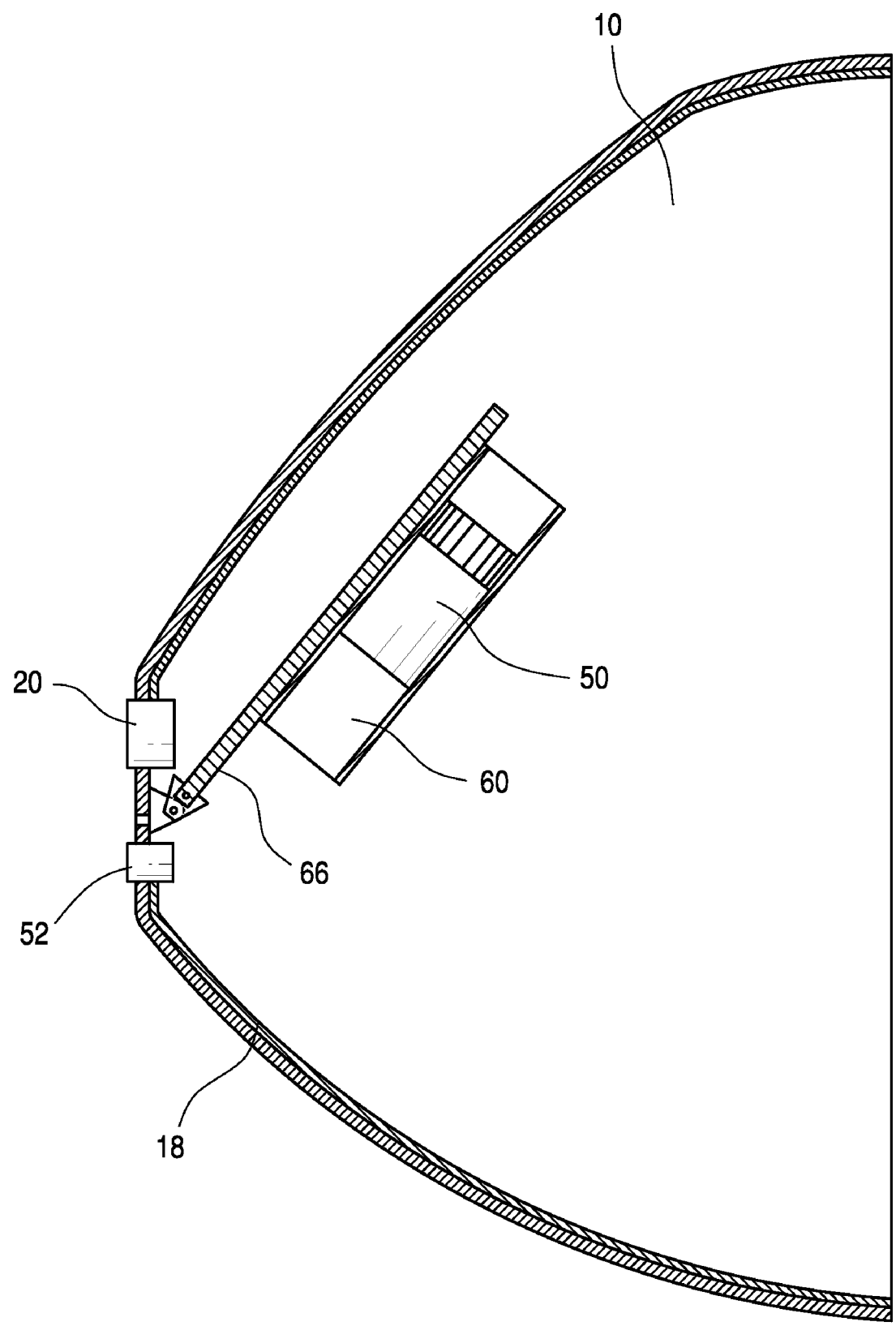
FIG. 3 is a sectional view taken along the symmetrical middle line of the mask in the invention.
Figure 4A:
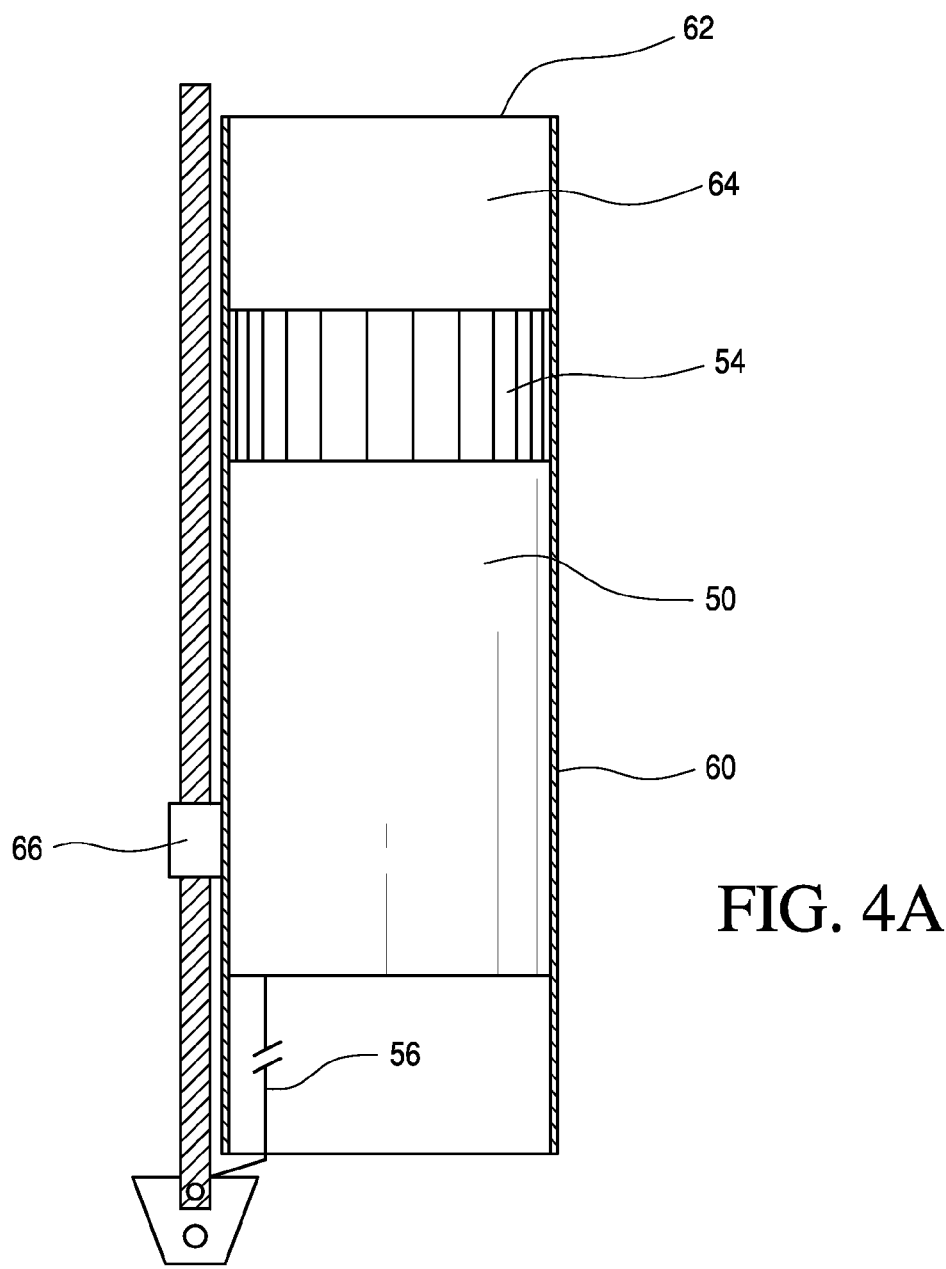
FIG. 4A is an enlarged detail view of the microphone arranged in the sound tube.
Figure 4B:
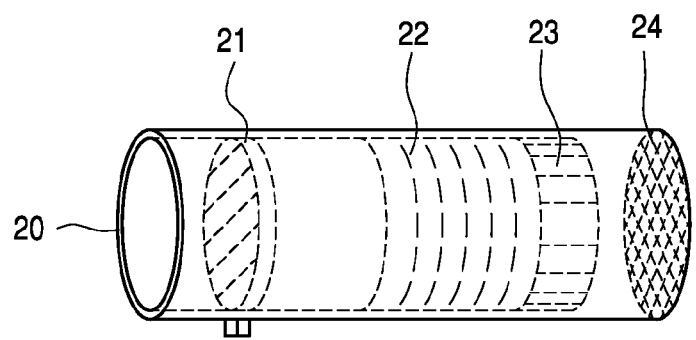
FIG. 4B is an enlarged detail view of the bracket holding the sound tube containing the microphone.

Referring now to FIG. 3 and FIG. 4, microphone 50 is situated in hollow tube 60. Microphone 50 is preferably of a Noise Canceling Electret Condenser microphone. The Electret type microphone is small enough to fit into the mask. A noise canceling type microphone helps to cancel out microphone noise cause by reflected waves.

The microphone can be in a round shape and with about 1.5 cm or less in diameter. Microphone 50 is mounted inside hollow sound tube 60 facing open end 62. Space 64 is provided in the tube in front of the microphone's front end 54. Preferably a open cell foam material, such as is found covering many portable microphones and the speakers of potable headsets, is provided in space 64. This foam material helps to reduce direct blowing onto the microphone diaphragm and thus reduces sound distortion.

The material for the tube 60 can be any suitable polymer. The hollow tube may have a length to diameter ratio of about 3:1 to 2:1. The tube length can range from 5 mm to 7 cm. The I.D. of the tube varies from 0.5 cm to 1.5 cm depending on the diameter of the microphone used. Space 64 is provided by placing the microphone at a location with a distance from 0.1 cm to 7 cm between the open end of the tube and the front end of the microphone. Microphone 50 can be held in tube 60 by fractional force or by any suitable brackets.

It has been found to be substantially advantageous to position the microphone in a hollow sound tube with a space in front of the front end of the microphone. Experiments reveal that this arrangement provides very good voice fidelity. When vocal sounds are directed into a privacy mask there are multiple opportunities for the sound waves to reflect off the internal walls. Multiply reflected sound waves can interfere with the primary sound wave originating from the mouth and heading directly towards the microphone. The tube which shrouds the microphone prevents many of the reflected waves from destructively combining with the sound wave traveling directly towards the microphone head from the mouth.

Apparently, the small space in front of the front end of the microphone provides a channel for the direct transmission of sound waves from the user's voice to the microphone while simultaneously shielding the microphone from sound waves reflected from the inside walls of the mask. This small open channel, plus preferable noise canceling electrets condenser type microphone, delivers natural speech voice to the cell phone. The placement of a hollow sound tube structure inside the housing 10 serves also as an internal muffler to deaden the noise. This hollow tube structure regulates the sound inside the mask and restricts the reflected noise and also dampens the intensity of the sound wave reaching the microphone.

Hollow sound tube 60 is mounted in housing 10, preferably at closed end 13 of housing 10, via bracket 66. With a more detailed view in FIG. 4 A, bracket 66 can be an extended support so the tube is movable linearly. Preferably, the bracket should facilitate an adjustable distance between the user's mouth and the open end of the tube in a range from about 0.1 cm to 6.5 cm, depends on the user's speech style. Bracket 66 should also be adjustable angularly in order to make the microphone to be oriented anywhere from a position pointing directly towards the mouth to a position in an opposite direction from the mouth. Although the orientation of hollow tube 60 can be in any direction, it is preferred that tube 60 be placed with a direction ranged from facing the user's mouth directly to a direction perpendicular to the linear direction of the user's mouth. Tube 60 is more preferably positioned pointing directly at the mouth with open end 62. This position leads to a voice signal of greater volume and therefore more intelligibility.

Connecting means 52 is provided in wall 12 for conventional electric connection to microphone 50. An electric cord 56 is connected to the connecting means 52 for external connection between microphone 50 and cell phone 2. If an ear piece is provided, a two-way electric cord can be used to connect the ear piece, the microphone and the cell phone. These are conventional electric connections.

One of the objectives of the present invention is to muffle the sound waves so that vocal sounds at close range are hardly audible. Preferably, an internal lining 18 is attached on the inner surface of the wall for subduing the sound from escaping the mask. The lining serves further to muffle the sound of the user's voice and to absorb breath moisture within the device. Lining 18 can be a perforated soft vinyl plastic, a fabric material, such as cotton mat or felt. Lining 18 can be removable. This allows lining 18 to be easily replaced for periodic cleaning to maintain the device in a more biologically acceptable condition.

Another embodiment of the mask provides a bigger housing portion 10, which covers both the nose and mouth of the user. In this case, a flapper (two-way) valve is preferred to allow unimpeded inhalation of air. The flapper valve is normally in the closed position. When the user inhales a negative pressure is generated which opens the flapper valve and allows unimpeded air flow. For a mask providing purified air for breathing and to prevent the transmission of disease, the mask can utilize a two-way flapper valves as an inhalation pathway which opens when the user inhales.

By providing filtering means to the mask with a bigger housing portion covering both nose and mouth of the user, the mask can become a powerful tool to prevent the transmission of airborne disease. When a suitable filter is placed over valve 20 having a flapper valve 21, shown at FIG. 4 B, the mask serves also for purification of inhaled air, in addition to safeguarding communication privacy. In the preferred embodiment of FIG. 4 B, the filter is multistage and includes a HEPA filter 22, a carbon filter 23 and a micro particle filter 24, such as used in a TB mask. Thus all the inhaled air is filtered for small particles, dust allergens and infectious organisms including the flu virus the mycobacterium which causes tuberculosis. Thus the mask provides purified and aseptic air.

A more elaborated embodiment may further incorporate a scent delivery means in the mask. For a simpler embodiment, a clip is provided to keep the mask flat for storage while it was not in use.

Figure 5:
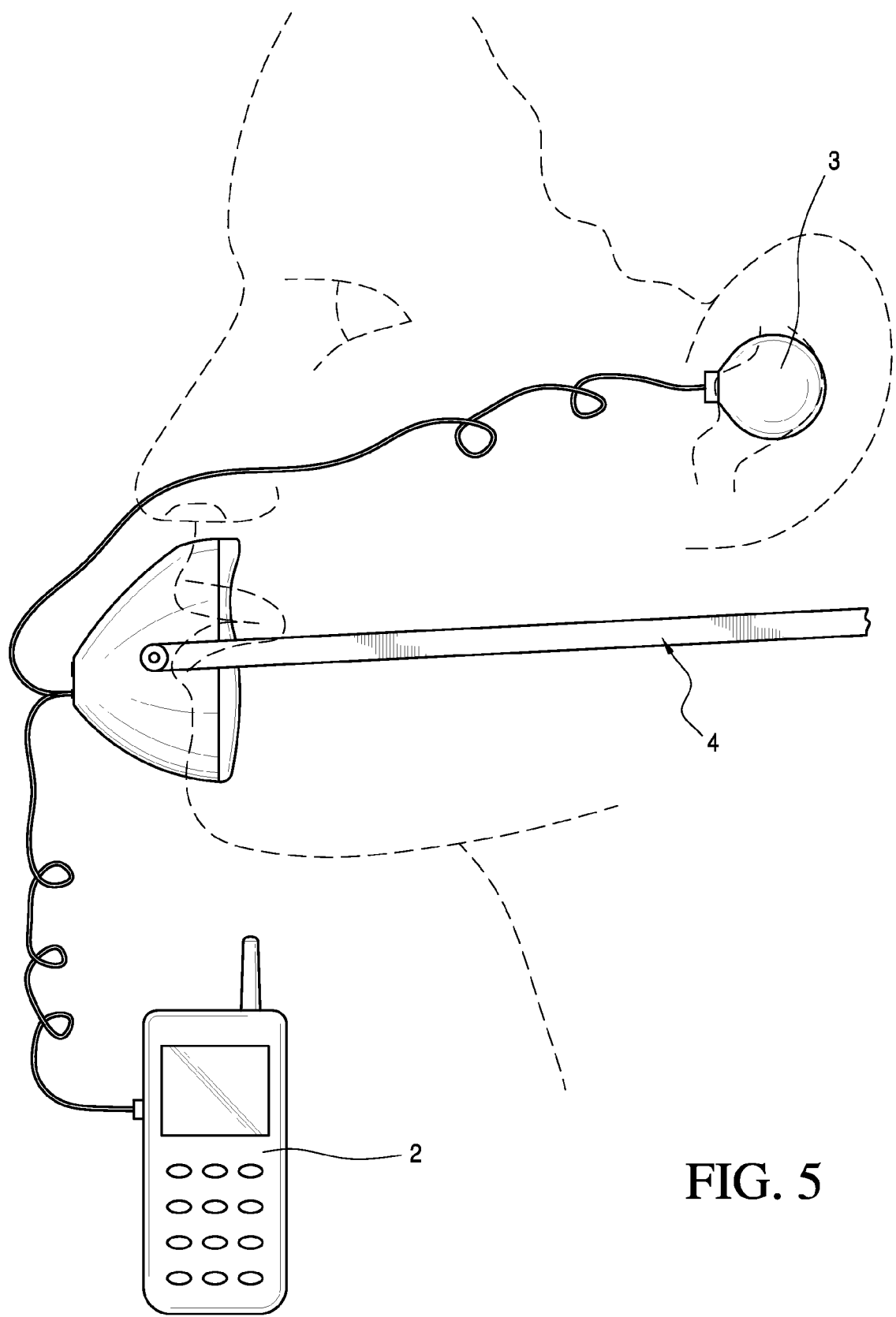
FIG. 5 is a descriptive illustration of an embodiment in use with a ear piece connected with the mask and a cell phone.

Although the mask can be generally held against the user's face, the device can also be mounted on a headset. A carrying strap or sling 4, preferably adjustable, can also be provided and is preferably attachable to the housing 10. FIG. 5 illustrates the device of present invention in use, where a user uses mask 1 connected with cell phone 2, ear piece 3 and carrying strap 4.

The invention has been described above with particular reference to preferred embodiments thereof, but it will be understood that variations and modifications are within the spirit and scope of the invention.

What is claimed is:

1. A communication privacy mask, comprising:
    a cup-shaped air-tight housing having a wall with a closed end and an opening for positioning on a user's face and over the user's mouth;
    a sound tube having an open end orientated directly at said user's mouth in said opening, and said sound tube being mounted on said closed end of said wall inside said housing via a bracket which is adjustable linearly and angularly;
    a microphone mounted in said sound tube with a space between the open end of the tube and a front end of said microphone; and
    an adjustable valve in said closed end of said wall, collinear with said user's mouth, which maintains pressure in said mask when said mask is positioned over said user's mouth.

2. The communication privacy mask of claim 1, further comprising:
    one or more perforations penetrating said wall of the housing.

3. The communication privacy mask of claim 1, further comprising:
    a flexible mouthpiece mounted on said opening of said housing to conform to said user's face around said user's mouth.

4. The communication privacy mask of claim 1, wherein said tube has a length of about 0.5 cm to about 7.5 cm.

5. The communication privacy mask of claim 1, wherein said tube has an inside diameter of about 0.6 cm to about 1.3 cm.

6. The communication privacy mask of claim 1, wherein said tube has a length to diameter ratio of about 3:1 to 2:1.

7. The communication privacy mask of claim 1, wherein said space in said tube has about 0.1 cm to about 7 cm in depth.

8. The communication privacy mask of claim 1, further comprises:
    a soft foam material filled in said space in said tube.

9. The communication privacy mask of claim 1, wherein said microphone is a noise canceling type microphone.

10. The communication privacy mask of claim 1, further comprises:
    a connecting leans provided in said wall for electrical connections.

11. The communication privacy mask of claim 1, wherein said adjustable valve is a spring loaded valve whose opening is proportional to an internal pressure of said masks.

12. The communication privacy mask of claim 1, further comprises:
    a carrying strap fixed on the wall of said mask.

* * * * *